June 25, 1963

T. J. RHODES 3,095,025

TIRE CHAIN

Filed July 14, 1961

INVENTOR
THOMAS J. RHODES
BY
*Paul H. Blaustein*
ATTORNEY.

June 25, 1963 T. J. RHODES 3,095,025
TIRE CHAIN
Filed July 14, 1961
3 Sheets-Sheet 2

INVENTOR
THOMAS J. RHODES
BY
Paul H. Blaustein
ATTORNEY.

INVENTOR
THOMAS J. RHODES
BY
Paul H. Blaustein
ATTORNEY.

United States Patent Office 3,095,025
Patented June 25, 1963

3,095,025
TIRE CHAIN
Thomas J. Rhodes, Smoke Rise, Kinnelon Borough, N.J., assignor to United States Rubber Company, New York, N.Y., a corporation of New Jersey
Filed July 14, 1961, Ser. No. 124,158
11 Claims. (Cl. 152—241)

This invention relates to an improved anti-skid tire chain which may be assembled easily upon a tire without jacking up the car or without requiring the assembler to lie on the ground or touch the car in any way.

I have recognized that a tire chain which is generally loose and difficult to handle can be stiffened and made manageable by partially embedding selected parts of the chain in an elastomeric material, such as a polyurethane compound and by providing a rigid element to connect with these parts. Further, I have provided tread chain members which are arranged at an angle to the direction such chain members are usually arranged. In so doing, I have found that I can reduce the number of tread chain members usually found on conventional chains. In addition, as described herein, my tire chain may be easily assembled on a mounted tire without lifting the car.

Accordingly an object of this invention is to provide a tire chain which may be quickly assembled upon the car without jacking up the car.

A further object of this invention is to provide a tire chain in which selected parts of the chain are stiffened to become semi-rigid and avoid the floppy loose characteristics which are common to tire chains.

A still further object of this invention is to provide a tire chain which may be mounted upon a tire of the car without jacking up the car and which does not utilize any fastening device that attaches to the rim of the wheel.

Another object of this invention is to provide a tire chain having cross chains arranged at an angle to each other and which can be mounted adjacent the foot pad of the tire.

Other objects and advantages of this invention will become apparent from the following description taken in connection with the accompanying drawings, wherein are set forth by way of illustration, an embodiment of this invention.

*Tire Chain Assembly Including Tread Members*

Figure 1:
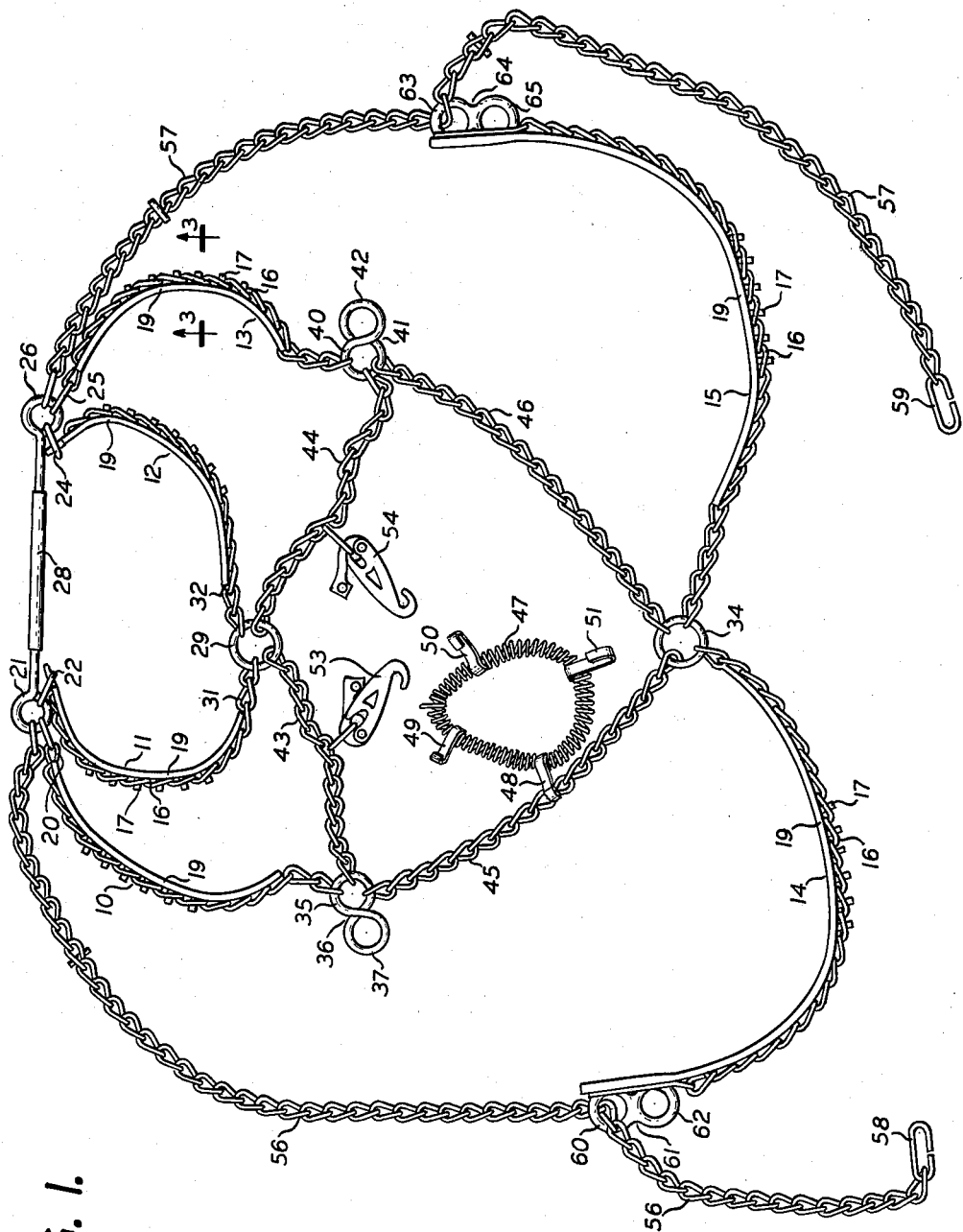
FIG. 1 shows the tire chain of this invention laid out flat before mounting on a tire.

Referring now to the drawings, at FIG. 1 there is shown a tire chain which is laid flat upon the ground in desired position before assembling on the tire. It comprises tread members or cross members 10, 11, 12 and 13 as shown in the upper part of FIG. 1 and tread members 14 and 15 shown in the lower half of FIG. 1. Tread member 10 is connected to a loop 21 through a fastener 20 and tread member 11 is connected to the same loop 21 through fastener 22. The use of such fasteners 20 and 22 are optional in providing the link with a loop 21.

The lower part of tread member 11 is connected to a loop 29. Additional tread links 31 may be incorporated at the end of tread member 11 if desired. Also connected to loop 29 (optionally through additional tread links 32), is tread member 12, the upper end of which is attached to loop 26 by means of fastener 24. Attached to loop 26 is tread member 13 by fastener 25. The general configuration of tread members 10, 11, 12 and 13 as thus described resembles an M with side legs formed of tread members 10 and 13 and middle legs formed of tread members 11 and 12, the lower vertex being loop 29. Between loops 21 and 26 is a rigid bar 28 which may be adjustable in length. Provisions for such adjustment is useful to provide a chain to fit various sizes of tires. This adjustment may be provided by having telescoping sections formed of rods. However, when applied over any given tire, rigid bar 28 is fixed and set at the constant length most suitable for that size of tire.

Figure 3:
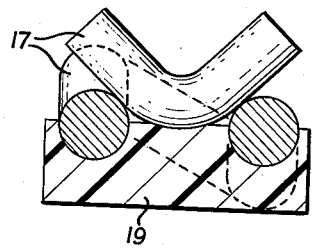
FIG. 3 is a cross-section of the tread chain member of FIG. 1.

Referring temporarily to FIG. 3, each of the tread members 10, 11, 12 and 13 comprise chain links and extending lugs 17 all of which are partially embedded in an elastomeric material 19 forming flexible tensile tread segments. It is essential that the chain elements of the tread member be only partially embedded so that lugs 17 extend therefrom so as to provide contact with the ground surface over which the tire tread will pass. The elastomeric material reduces wear of the tire by the chain and keeps the lugs positioned to face the road. Each of the tread members 10, 11, 12 and 13 form, therefore, a flexible tensile means which is sufficient in length for extension across the tread surface of the tire.

The lugs which protrude from the elastomeric material on one face of the assembly provide gripping means. The actual form of the tread member, aside from the elastomeric material may be conventional and the links may be formed as described in the patent to Hall, U.S. 2,180,098 as at FIG. 2 therein.

By so embedding the tread member 10 partially in an elastomeric material, it becomes a semi-rigid body and may be easily gripped and held in position while assembling the chain upon a tire. It has been found that an elastomeric material such as polyurethane is highly desirable for embedding the elements of tread member 10. However, natural or synthetic (SBR) rubber may also be used.

It may now be noted, referring back to FIG. 1, that the M type arrangement of tread members 10, 11, 12 and 13 in conjunction with the rigid bar 28 connected at the upper vertices of the M, form what may be considered a harness or a saddle which may be thrown on top of a tire much as a saddle is applied over a horse. The tread members 10, 11, 12 and 13 overlie the tread surface while the rigid bar 28 falls to the rear of the tire. The upper two vertices of the M-shaped structure are separated and remain separated by the fixed distance set by the rigid bar 28.

Continuing the description of the tire chain shown at FIG. 1, the lower end of tread member 10 is a double or figure-8-type loop 36 having an inner loop 35 and outer loop 37. Tread member 10 is linked to the inner loop 35 by means of additional links or fasteners as desired. Connected to the bottom end of tread member 13, is a similar double or figure-8-type loop 41 having an inner loop 40 and an outer loop 42. Tread member 13 is connected to inner loop 40 through means of links or fasteners as desired.

*Outer Chain Section*

Chain sections 43, 44, 45 and 46 are linked together to form an endless outer chain. The chain sections 43–46 provide an endless flexible tensile means being shorter in length than the outer circumference of the tire. Chain section 43 is linked at its ends to loops 35 and 29. Chain section 44 is linked to loops 29 and 40. Chain section 46 is linked to loops 40 and 34 and chain section 45 is linked to loops 35 and 34.

Connected also to loop 34, are tread members 14 and 15 which are constructed the same as tread members 10–13. As shown, tread members 14 and 15 are arranged as an inverted V having its vertex at loop 34. At the lower end of tread member 14 is connected a double loop or figure-8-type loop 61 having an inner loop 60 and an outer loop 62. At the lower end of tread member 15 is connected a double or figure-8-type loop 64 having an inner loop 63 and an outer loop 65. Tread members 14 and 15 may be connected to loops 61 and 64, respectively, by means of welding or by an appropriate linkage.

Inner Chain Section

The inner section of the tire chain does not feature an endless chain as does the outer section, but comprises a inner chain 56 which is linked at its upper end to loop 21 and a inner chain 57 having its upper end linked with loop 26.

Chain 56 passes through but is not linked to inner loop 60 while chain 57 passes through but is not linked to inner loop 63.

At the end of chains 56 and 57 are coupling elements or loops 58 and 59. Eventually, these coupling elements 58 and 59 will be received and secured to clamps 54 and 53, respectively, each of which is linked at locations intermediate of outer chain sections 44 and 43 respectively.

Chain Tightening Means

In order to be able to tighten the endless outer circumferential chain formed of sections 43–46 and the entire chain when mounted on a tire, an endless helical spring 47 is provided having a plurality of clips 48, 49, 50 and 51 which have an arcuate upper section adapted to receive and grip one of the chain links in each of chain sections 45, 43, 44 and 46 respectively.

Method of Assembly

In order to assemble the chain of the tire, the chain may first be laid out as shown in FIG. 1. Any contact with the tire or car by the operator can be avoided by the use of simple tools in the form of curved rods which can reach around the tire to manipulate the chain in a way to be described. Curved rods 70 and 72 (FIG. 2) may be attached to coupling elements 58 and 59 respectively. The chain may be gripped at tread members 11 and 12, picked up and draped over the top of a tire in a manner similar to draping a saddle, rigid bar 28 naturally falling to the rear.

Figure 2:
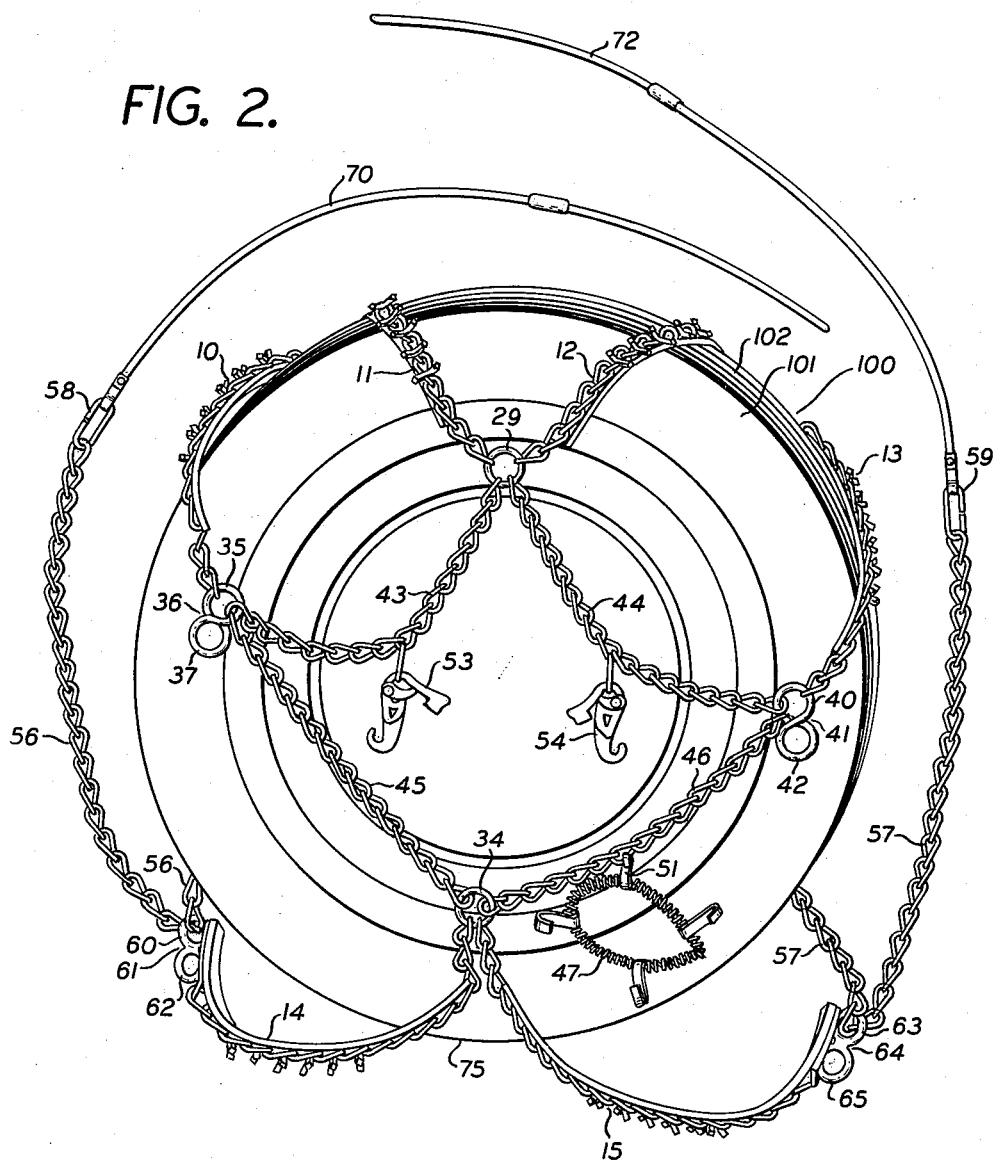
FIG. 2 is a front view of the tire showing the tire chain after it has been draped over the tires.

As shown at FIG. 2, the tire 100 has an outer surface 101, tread surface 102 and an inner surface, not shown. When the chain is draped over the tire, the tread members 10, 11, 12 and 13 form an M arrangement. The nature of the endless circumferential outer section formed by front chain sections 43, 44, 45 and 46 is seen more easily at FIG. 2. Rods 70 and 72 are moved along the ground toward the inner surface of the tire in order to allow tread members 14 and 15 to come across the bottom part of tread 102. In this position, the entire chain is relatively loose.

Figure 4:
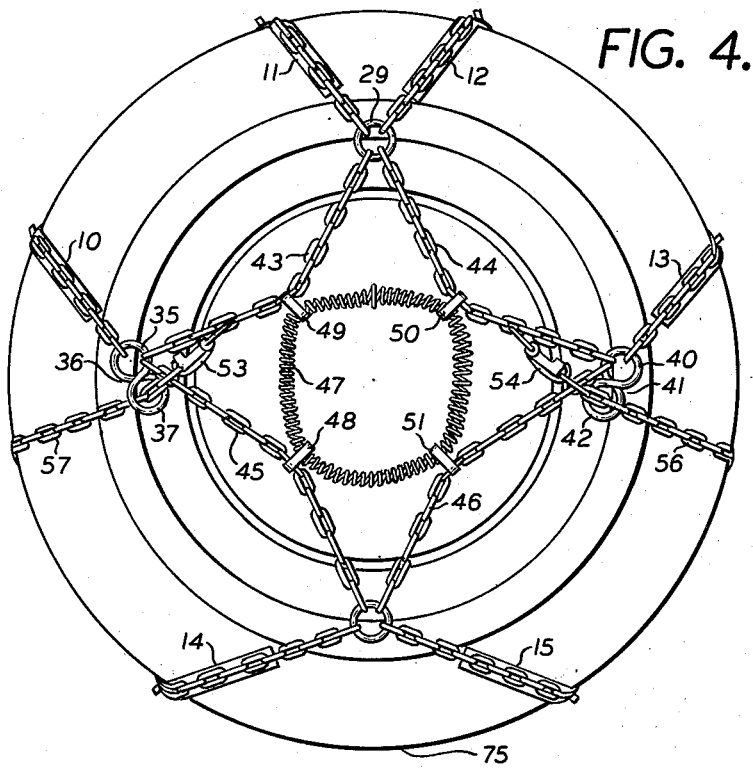
FIG. 4 is a front view of the tire after the chain has been fully mounted on the tire.
Figure 5:
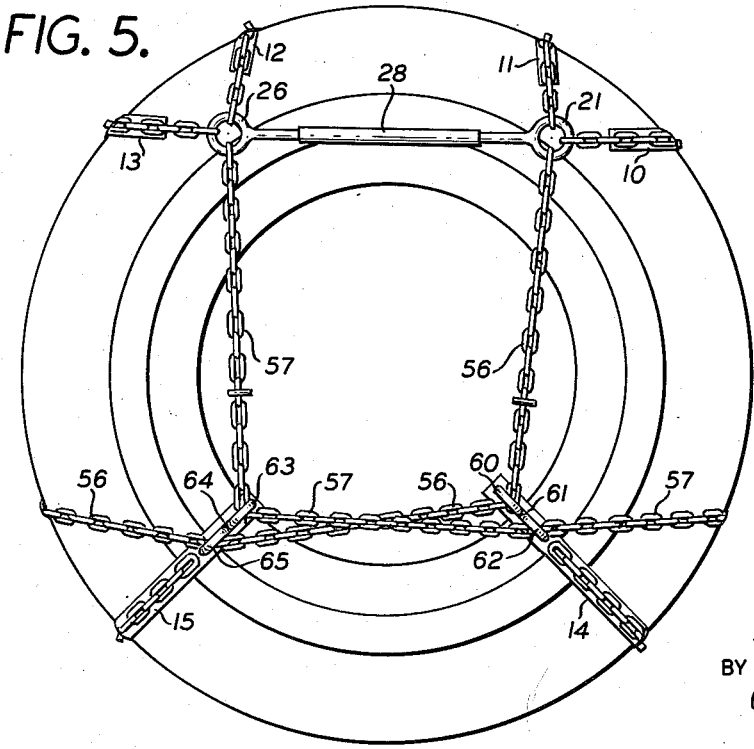
FIG. 5 is a back view of the tire after the chain has been fully mounted.

In order to tighten the tread chain over the tire 100, rod 70 should be passed through outer loop 65 and pulled therethrough, allowing chain section 56 to pass through outer loop 65, all of which is shown more clearly in FIG. 5. Similarly, rod 72 should be made to pass through outer loop 62 and pulled forward so that chain 57 will pass through outer loop 62. Thereafter, the sections of chains 56 and 57 may be pulled and drawn across the tread of the tire as shown at FIG. 4. Chain 56 will pass through outer loop 42 and thereafter be pulled tight before being received and clamped by clamp 54. Clamp 54 may be made to grip any part of chain 56 but preferably the end coupling element 58. Similarly, chain 57 will be drawn across the tread of the tire and made to pass through outer loop 37 to be received and coupled by clamp 53 which acts similarly on coupling element 59. The clamps provided a fastening means for securing the free ends of the first and second flexible tensile means to said endless flexible means. If desired, jacks suitable for pulling with mechanical advantage may be used to tighten the chains where the chain is to be applied to a wheel that is mired as high as the hub cap. The jacks then also serve to fasten the ends of chains 57 and 58.

Thus far the operations in assembling the tire chain have been as follows: first, the tire chain is draped over the top of the tire; second, the rods draw the chains 56 and 57 through outer loops 62 and 65; third, chains 56 and 57 are pulled across the tread and through outer loops 42 and 37 respectively to be clamped by clamps 54 and 53 respectively.

Finally it is necessary to tighten the chain so that it fits snugly on the tire and does not rattle excessively while the car is in motion. This is accomplished by a means which pulls the outer chain section formed of outer chains 43–46 radially inwardly thereby pulling loops 29, 41, 34 and 36 radially inwardly. This may be accomplished for example by means of an endless helical spring 47 having clips 48–51 which can grip any part of one of the links of the outer endless chain and hold it in place radially inwardly.

Operation of Chain

Figure 6:
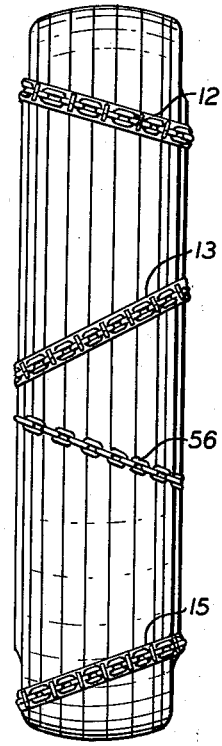
FIG. 6 is a side view of the tire, showing the tread of the tire after the chain has been fully mounted.

In operation, this type of tire chain provides important dynamic advantages. First it is to be noted that the parts of the chain which fit across the tread, tread members 10–15 and parts of chains 56 and 57 as shown in FIG. 6 which lie across the tread, are slanted; that is, they are not parallel to the rotational axis of the tire but form an angle with it. A whole tread member touches ground and the slant gives more gripping surface per chain element. This slant effect provides a tire chain which provides frictional contact with the ground over a larger proportion of the circumferential length of the tire and fewer cross chains are required than in conventional chains.

Further it should be noted that the outer endless chain section formed of chains 43–46 has four corners and forms a square before tightening means 47 is applied, while the inner chain section, shown more clearly at FIG. 5, comprising rod 28, and chains 56 and 57 form a second or inner square (chains 56 and 57 forming three sides of the square), but this inner square is offset from superposition on said first square by a rotation of 45°. It is to be noted that there are two tread members connected at each corner of the inner square. For example, the loop 26 may be considered one corner of the square and it has tread members 12 and 13 emanating therefrom. Double loop 64 has emanating from it, tread member 15 and a segment of chain 56, which, where it passes over the tread, acts as a tread member. Each of the corners of the outer endless chain section receive two tread members, but each of the received tread members emanates from a different corner of the inner square from the other. For example, as shown in FIG. 4, loop 29 receives tread members 11 and 12, but tread member 11 emanates from the vertex 21 (see FIG. 5) while tread member 12 emanates from loop 26. This particular arrangement allows the chain to be mounted without sliding it past the foot pad 75 (that part of the tire which is in contact with the ground); that is, the use of tread members 14 and 15 arranged as a V allows the tread member to miss the foot pad of the tire. Therefore, the chain can be mounted without raising the car.

The chain may be removed by disengaging one or more of clips 48–51, thereby disengaging spring 47. Clamps 54 and 53 are opened and chains 56 and 57 may be withdrawn through loops 42, 65 and 37, 62 respectively. Thereafter, the entire chain may be removed by gripping at tread members 11 and 12 and pulling the chain in a generally outwardly manner.

Having thus described my invention, what I claim and desire to protect by Letters Patent is:

1. A tire chain assembly comprising: an endless outer side chain means; first and second loop means positioned substantially at diametrically opposed points on said outer chain; third and fourth loop means positioned substantially at diametrically opposed points on said outer chain and midway between said first and second loop means; a plurality of tread members, each tread member having chain links and extending lugs, and being partially embedded in an elastomeric material so that the extending lugs are substantially uncovered, a first and second of said tread members each being coupled at one end thereof to said first loop means; a third and fourth of said tread members each being coupled at one end thereof to said second loop means; a rigid bar coupled at either end to the other ends of said first and second tread members; a first inner chain coupled to said bar and to said first tread member at the said other end of said first tread member; a second inner chain coupled to said rod and to said second tread member at the said other end of said second tread member; fifth and sixth loop means coupled to the other ends of said third and fourth tread members, respectively, to receive said inner chains; first and second clamping means coupled to said endless outer side chain means at spaced-apart points to receive said inner chains, whereby, upon assembly on a tire, said first inner chain may pass successively through said fifth loop means, said sixth loop means, said fourth loop means and thence to said first clamping means, and said second inner chain may pass successively through said sixth loop means, said fifth loop means, said third loop means and thence to said second clamping means.

2. The tire chain assembly of claim 1 in which additional tread members are coupled at their ends to said outer chain means and at their other ends to said rigid bar.

3. A tire chain assembly comprising: an endless outer side chain means; first and second loop means positioned substantially at diametrically opposed points on said outer chain; third and fourth loop means positioned substantially at diametrically opposed points on said outer chain and midway between said first and second loop means; a plurality of tread members, each tread member having chain links and extending lugs, and being partially embedded in an elastomeric material so that the extending lugs are substantially uncovered; a first and second of said tread members each being coupled at one end to said first loop means, a third and fourth of said tread members each being coupled at one end to said second loop means; a rigid bar coupled to the other ends of said first and second tread members; a first inner chain coupled to said bar and to said other end of said first tread member; a second inner chain coupled to said rod and to said other end of said second tread member; fifth and sixth loop means coupled respectively, to the other ends of said third and fourth tread members to receive said inner chains; first and second clamping means coupled to said endless outer side chain means at spaced apart points to receive said inner chains whereby, upon assembly on a tire, said first inner chain may pass successively through said fifth loop means, said sixth loop means, said fourth loop means and thence to said first clamping means, and said second inner chain may pass successively through said sixth loop means, said fifth loop means, said third loop means and thence to said second clamping means.

4. A tire chain assembly as in claim 3 in which said third, fourth, fifth and sixth loop means are double loops.

5. A tire chain assembly as in claim 4 which further comprises an endless helical spring having link-engaging clips attached thereto whereby said outer side chain element may be tightened after said tire chain is mounted on a tire.

6. An anti-skid chain for an automobile tire comprising a continuous outer side chain means, a first plurality of flexible tread members, each member being embedded in a tough elastomeric material which renders the members semi-rigid, gripping means protruding from one face of said elastomeric material, said tread members being connected end to end for oblique disposition across the tire tread to form a zig-zag structure having central and other vertices, the central vertex of said zig-zag structure being attached to a first point on said outer chain means, and the terminal points of said zig-zag structure being connected to second and third points on said outer chain means removed by substantially one-quarter of the total length of said outer chain means from said first point and on either side thereof, other vertices of said zig-zag structure being separated by a rigid bar which makes up a portion of an inner side element, first and second inner side chains each connected to said rigid bar at one of said intermediate vertices, a second plurality of tread members connected to form a V-shaped structure, the vertex of said V being attached to said outer chain means at a fourth point substantially half the total length of said outer chain means from said first point, the other end of each of said second plurality of tread members being fitted with loop means having internal diameter sufficient to be threaded by said first and second inner side chains, two fastening means for securing a free end of each of said first and second inner side chains to said outer side chain means.

7. The anti-skid chain of claim 6 wherein said rigid bar is of adjustable length.

8. The tire chain of claim 6 wherein said fastening means are jacks suitable for pulling, with mechanical advantage, and securing said first and second inner side chains.

9. An anti-skid chain for an automobile tire comprising: endless outer flexible tensile means being shorter in length than the circumference of said tire; a plurality of flexible tensile tread members, each member being embedded in a tough elastomeric material; gripping means protruding from said elastomeric material on one face of said tread members; a first tread member being connected at one of its extremities to a first point on said endless outer flexible tensile means, second and third tread members being connected at one of their respective extremities to a second point on said endless outer flexible tensile means, a fourth tread member being attached at one of its extremities to a third point on said endless outer flexible tensile means and, fifth and sixth tread members being attached at one of their respective extremities to a fourth point on said endless outer flexible tensile means, the four said points being spaced approximately equidistantly on the said endless means; a bar of length approximately equal to that of said tread members being attached at one end to the other extremity, respectively, of said first and second tread members and at the other end to the other extremity, respectively, of said third and fourth tread members; first and second inner flexible tensile means, one extremity of each being attached to a respective end of said bar; loop means at the other extremities of said fifth and sixth members, said loop means being threaded with said first and second inner flexible tensile means, respectively; and fastening means for securing the free ends of said first and second inner flexible tensile means to said endless outer flexible means.

10. The anti-skid chain of claim 9 in which the two said fastening means are attached to said endless outer flexible means between said first and said second points and between said first and said third points, respectively, for securing the free ends of said first and second inner flexible tensile means to said endless outer flexible means.

11. A tire chain assembly comprising: an endless outer side chain means; first and second loop means positioned substantially at diametrically opposed points on said outer chain; third and fourth loop means positioned substantially at diametrically opposed points on said outer chain and midway between said first and second loop means; a plurality of tread members, a first and second of said tread members each being coupled at one end thereof to said first loop means; the third and fourth of said tread members each being coupled at one end thereof to said second loop means; a rigid bar coupled at either end to the other ends of said first and second tread members; a first inner chain coupled to said bar and to said first tread member at the said other end of said first tread member; a second inner chain coupled to said rod and to said second tread member at the said other end of said second tread member; fifth and sixth loop means coupled to the other ends of said third and fourth tread members, respectively, to receive said inner chains; first and second clamping means coupled to said endless inner chain means at spaced-apart points to receive said inner chains, whereby, upon assembly on a tire, said first inner chain may pass successively through said fifth loop means, said sixth loop means, said fourth loop means and thence to said first clamping means, and said second inner chain may pass successively through said sixth loop means, said fifth loop means, said third loop means and thence to said second clamping means.

References Cited in the file of this patent

UNITED STATES PATENTS

| | | |
|---|---|---|
| 1,316,873 | Berndt | Sept. 23, 1919 |
| 1,493,878 | Hanson | May 13, 1924 |
| 1,953,495 | Nargi | Apr. 3, 1934 |
| 2,436,709 | Bozenhard et al. | Feb. 24, 1948 |
| 2,537,392 | Bettcher | Jan. 9, 1951 |
| 2,657,727 | Peterson | Nov. 3, 1953 |
| 2,984,280 | Emmerich | May 16, 1961 |